UNITED STATES PATENT OFFICE.

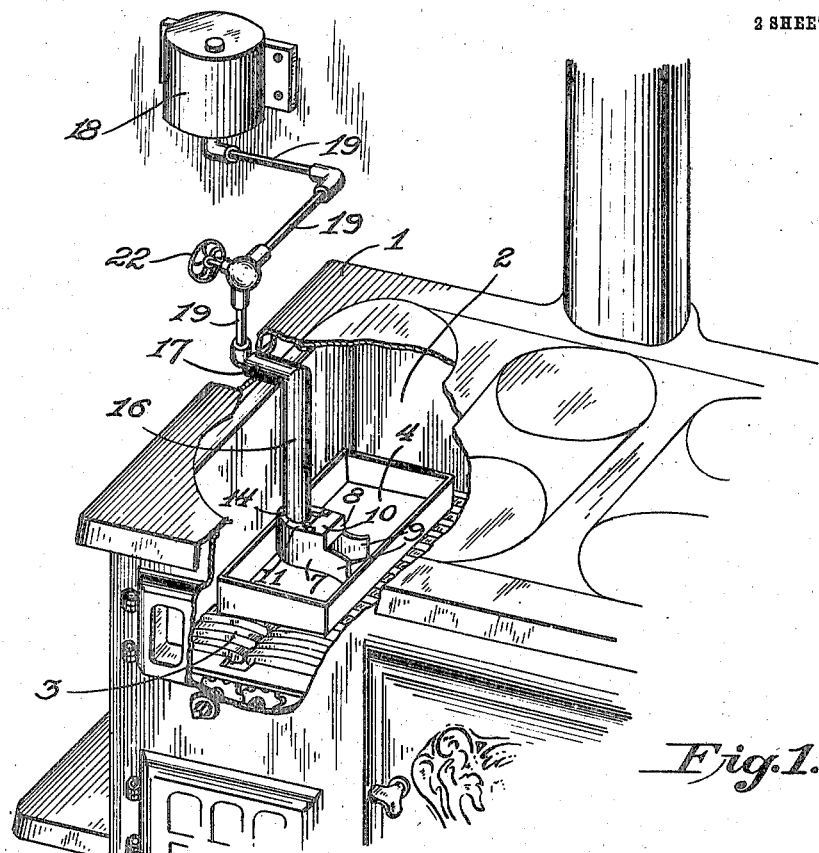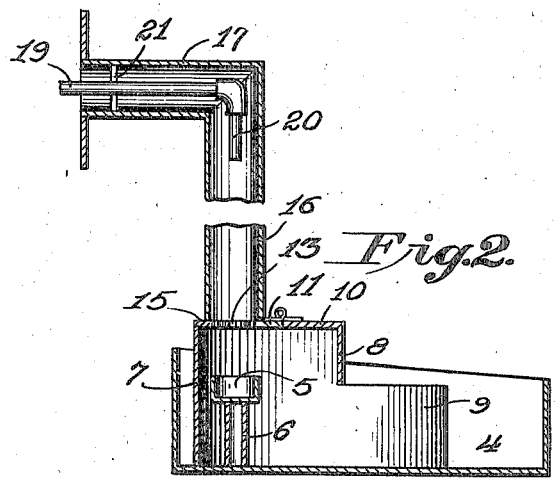

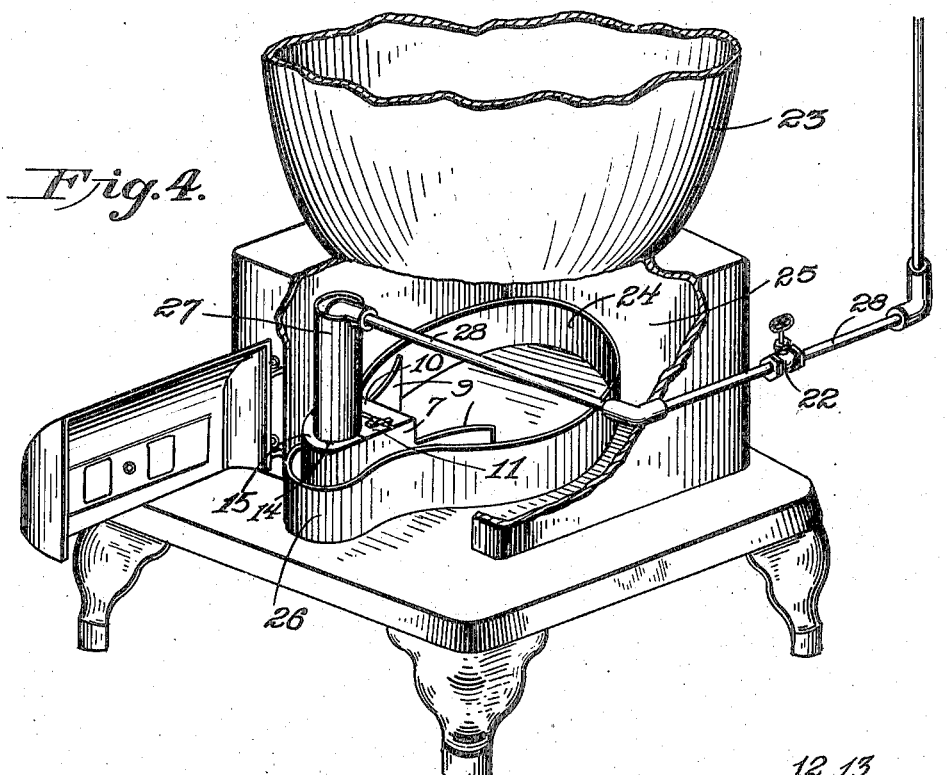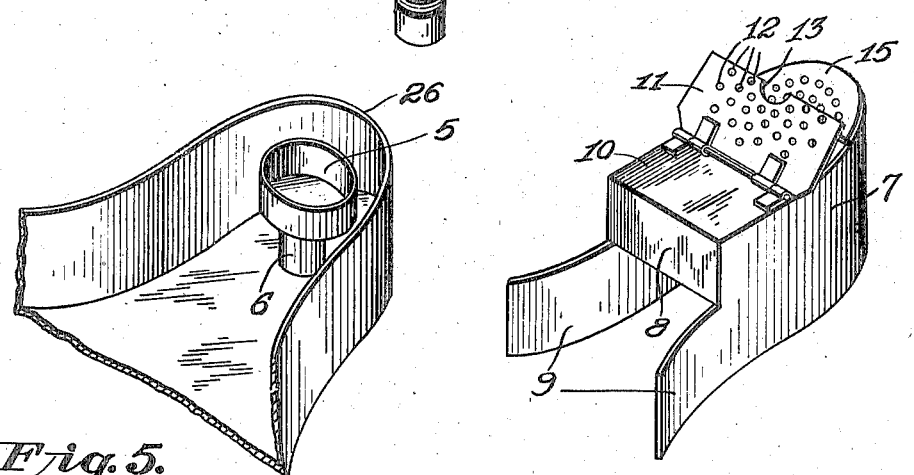

MILTON D. MAHANAY AND JESSE D. PRICE, OF FREDERICK, OKLAHOMA; SAID PRICE ASSIGNOR OF ONE-HALF OF HIS RIGHT TO T. F. McKENZIE, OF FREDERICK, OKLAHOMA.

OIL-BURNER.

947,735.

Specification of Letters Patent. Patented Jan. 25, 1910.

Application filed October 1, 1909. Serial No. 520,439.

*To all whom it may concern:*

Be it known that we, MILTON D. MAHANAY and JESSE D. PRICE, citizen of the United States of America, residing at Frederick, in the county of Tillman and State of Oklahoma, have invented certain new and useful Improvements in Oil-Burners, of which the following is a specification, reference being had therein to the accompanying drawing.

This invention relates to burners for use in connection with crude oil, and the principal object of the same is to provide an oil burner that may be placed within a cooking or heating stove without requiring any change in the construction or arrangement of the parts of the stove.

In carrying out the objects of the invention generally stated above it will be understood, of course, that the essential features of the same are necessarily susceptible of changes in details and structural arrangements, certain preferred and practical embodiments of which are shown in the accompanying drawings, wherein:—

Figure 1 is a perspective view of a cooking stove showing the improved burner therein. Fig. 2 is a central vertical sectional view of the burner. Fig. 3 is a detail perspective view of the burner casing. Fig. 4 is a fragmentary perspective view of a heating stove showing the same equipped with a burner, certain details thereof being slightly modified from that shown in Fig. 1 to compensate for the different type of stove. Fig. 5 is a fragmentary detail perspective view of the burner pan used in connection with the form of the invention shown in Fig. 4.

Referring to said drawings by numerals, and more particularly to Fig. 1 thereof, 1 designates a cooking stove or range having the usual fire box 2 and grate 3. A substantially rectangular burner pan 4 is shown supported on the grate 3, said pan being provided with a burner cup 5 which is arranged adjacent one longitudinal side of said pan and supported above the bottom thereof by a vertical standard 6. A casing 7 is loosely fitted over the burner cup within the pan 4, said casing having one end closed, and the other end partially closed by an upper pendent flange 8, the open lower portion of said partially closed end being provided with oppositely disposed flaring diverging flanges 9 which direct the products of combustion from the interior of the casing to the fire box 2. The top 10 of the casing 7 has a lid 11 hinged thereto said lid being provided with a plurality of small perforations 12 and an edge opening 13 which, when the lid is closed, coöperates with a similar opening 14 in the edge of a perforated portion 15 of the top of the casing to provide an opening through which fuel is fed to the burner cup 5. An air supply pipe 16 has its lower end fitted over the perforated portion of the lid and the top of the casing 7, said pipe 16 having an angular upper end 17 which projects through the upper portion of the front of the stove. A fuel tank 18 is suitably supported by a wall or the like adjacent the stove 1, and carries a supply pipe 19 which projects into and through the angular end of the pipe 16 and has a pendent inner end 20 arranged so that it will drop fuel through the opening formed by the meeting edges of the lid and the top of the casing 7 to the burner cup 5. Said fuel supply pipe is supported centrally within the air pipe by suitable hangers 21. A controlling valve 22 is carried by the pipe 19 to regulate the supply of fuel.

In the form of the invention shown in Figs. 4–5, the burner is shown in connection with a heating stove 23. The burner pan has an enlarged rounded end 24 that is placed within the ash pit 25 of the stove, the other end being contracted, as indicated at 26 and projects outside said ash pit. The burner cup and casing are the same in this form of the invention as that described in connection with the cooking stove, but the air supply pipe 27, is simply a straight, vertical pipe section. The fuel supply pipe 28 extends into said air supply pipe 27 and delivers fuel in the manner previously described.

It will be seen that in both forms of the invention, the improved burner may be readily applied to, or removed from an ordinary stove, without the necessity of altering the stove.

In operation, fuel is fed to the burner cup 5 and ignited, which heats the casing 7 so that subsequent fuel is vaporized and burned within the casing, in a manner well understood. The necessary air supply is obtained through the air supply pipe, which causes the products of combustion from the burner to be forced out between the flaring flanges of the casing and deflected thereby and by the walls of the pan to all parts of the fire box.

As will be understood, the casing 7 is loose within the pan and the air supply pipe is loosely supported on the casing, so that parts of the burner may be readily separated to facilitate cleaning and the like.

What we claim as our invention is:—

1. A device of the character described, comprising a burner pan, a burner cup therein, a casing for said cup having an upper opening registering with said cup and a flaring end opening for the escape of products of combustion, an air supply pipe having one end surrounding the upper opening of said casing, a source of fuel supply, and a supply pipe extending therefrom and into said air supply pipe.

2. A device of the character described comprising a pan, a burner cup therein, a casing inclosing said cup having a sectional top and an end opening for the escape of products of combustion, an air supply pipe fitted over the fuel and air openings of the top of the casing, and a fuel supply pipe projecting into said air supply pipe.

3. A device of the character described comprising a burner pan adapted to be placed within a stove, a burner cup therein, a casing loosely mounted within said pan and surrounding said cup, said casing having an open end, diverging flanges carried by said open end, means for feeding air through the upper portion of said casing to said cup, and means for feeding fuel to said cup.

4. A device of the character described comprising a burner pan, a burner cup supported therein, a casing surrounding said cup and having an open end, diverging flanges projecting outwardly from said open end, an air supply pipe for said cup, and means for dropping fuel through said pipe to said cup.

5. A device of the character described comprising a burner pan, a burner therein, a casing loosely mounted in said pan having a perforated top portion one edge of which is provided with an air opening, a lid for said top provided with perforations and with an edge opening complemental to the edge opening of the top portion, said casing also having an open end, an air supply pipe having one end fitted over the perforations and openings of the top and lid, and a fuel supply pipe projecting into said air supply pipe.

6. In combination with a stove, a pan removably fitted therein, a burner cup in said pan, a casing surrounding said cup and provided with a sectional top having air and fuel inlets, said casing also having a flaring end opening for the discharge of products of combustion, an air supply pipe having one end loosely fitted over the air and fuel inlets, and a fuel supply pipe projecting into said air supply pipe and adapted to drop fuel through said fuel inlet to said burner cup.

In testimony whereof we hereunto affix our signatures in presence of two witnesses.

MILTON D. MAHANAY.
JESSE D. PRICE.

Witnesses:
D. B. PEARSON,
W. J. PACE.